United States Patent Office 3,541,066
Patented Nov. 17, 1970

1

3,541,066
2,3-DIHYDRO-1,4-ETHANOBENZO[b][1,5]
NAPHTHYRIDINE DERIVATIVES
Milton Wolf, West Chester, Pa., assignor to American Home Products Corporation, New York, N.Y., a corporation of Delaware
No Drawing. Continuation-in-part of application Ser. No. 533,816, Mar. 14, 1966. This application Sept. 16, 1968, Ser. No. 760,073
Int. Cl. C07d 39/10
U.S. Cl. 260—288                    7 Claims

ABSTRACT OF THE DISCLOSURE

This invention concerns 2,3-dihydro-1,4-ethanobenzo[b][1,5]naphthyridine compounds which have pharmacological activity as central nervous system depressant agents which are useful in producing a calming effect on animals.

This application is a continuation-in-part of United States patent application, Ser. No. 533,816, entitled "Novel 2,3-Dihydro-1,4-Ethanobenzo[b][1,5]Naphthyridine Derivatives," filed on Mar. 14, 1966, by Milton Wolf, now abandoned.

This invention relates to new and useful tricyclic nitrogen containing compounds as well as to the novel method for their preparation. In particular, the present invention is concerned with ethanobenzonaphthyridine compounds which in standard and accepted phamacological tests have demonstrated central nervous system depressant activity which is useful in producing a calming effect on animals.

The novel compounds which are included within the scope of this invention are selected from the group represented by the formula:

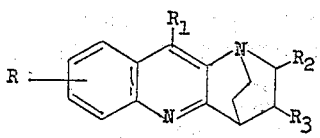

wherein R is selected from the group consisting of hydrogen, halogen, nitro, lower alkyl and lower alkoxy; $R_1$ is selected from the group consisting of hydrogen, lower alkyl, phenyl, halophenyl, lower alkylphenyl, lower alkoxyphenyl, benzyl, halobenzyl, lower alkylbenzyl, lower alkoxybenzyl, pyridyl, furyl and thienyl; and $R_2$ and $R_3$ are selected from the group consisting of hydrogen, lower alkyl, phenyl, lower alkylphenyl, halophenyl, lower alkoxyphenyl, benzyl, halobenzyl, lower alkylbenzyl, and lower alkoxybenzyl with the proviso that at least one of $R_2$ and $R_3$ is hydrogen. Examples of such compounds include: 8-chloro-2,3-dihydro-10-phenyl - 1,4 - ethanobenzo[b][1,5]naphthyridine; 8-chloro-10-(o-chlorophenyl)-2,3-dihydro-1,4-ethanobenzo[b][1,5]naphthyridine; and 2,3 - dihydro - 10 - phenyl - 1,4 - ethanobenzo[b][1,5]naphthyridine.

In accord with the process of the present invention, the above mentioned ethanobenzonaphthyridines may be prepared by the reaction of a 2-aminocarbonyl compound (I) with an appropriate 3-quinuclidinone (II), as exemplified by the following reaction scheme:

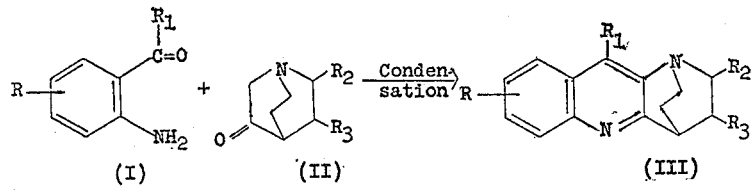

2 wherein R, $R_1$, $R_2$ and $R_3$ are defined as above. The reaction is effected by heating a substantially equimolar mixture of the reactants (I) and (II), in the presence of a strong acid, at a temperature from about 70° C. to about 200° C. for a period of from about one-half to two hours. Preferably, this reaction is conducted in polyphosphoric acid at about 200° C. for about one hour. By strong acid as employed herein is meant any organic or inorganic acid which dissolves the reactants and does not interfere with their interaction. Although many such acids may be employed, as will suggest themselves to those skilled in the art, excellent results have been obtained with polyphosphoric, trifluoroacetic, acetic and alkanesulfonic and arylsulfonic acids, for example, benzenesulfonic acid, toluenesulfonic acid, methylsulfonic acid and ethylsulfonic acid. The majority of the reactants employed in the process of this invention are known compounds which are readily available from commercial sources, while the remainder can be prepared in accordance with standard organic procedures will known to those skilled in the art.

After the reaction is complete, the reaction mixture is cooled and basified with an aqueous alkaline solution, for example, sodium hydroxide, potassium hydroxide, sodium bicarbonate and sodium carbonate. Thereafter, the product (III) is obtained by conventional methods, such as, filtration and crystallization from a suitable solvent, such as alkanol.

In accord with the present invention, the ethanobenzonaphthyridine compounds (III) of the present invention have been found to possess interesting pharmacological properties. More particularly, these compounds, in standard pharmacological tests, have exhibited utility as central nervous system depressant agents which are useful in producing a calming effect on animals.

In the pharmacological evaluation of the central nervous system depressant compounds (III) of this invention the in vivo effects of the compounds of this invention are tested as follows:

The compound is administered intraperitoneally and/or orally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate Method" [Nathan B. Eddy and Dorothy Leimbach, J. Pharmacol. Exper. Therap. 107, 385 (1953)] is used to test for analgesi. The experiment is terminated by subjecting each animal to a maximal electroshock to test for anti-convulsant activity.

The compounds (III) of this invention when administered intraperitoneally in the above test procedure induce decreased motor activity at 12.7 mg./kg. Similar results are obtained when these compounds are administered orally at a 40 mg./kg. There were no deaths in the test animals at the highest dose used, 400 mg./kg., intraperitoneally.

When the compounds of this invention are employed as central nervous system depressant agents to produce a calming effect they may be administered to warm-blooded animals, e.g., mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients as starch, milk, sugar, certain types of clay and so forth. They may also be administered orally in the form of solutions or they may be injected parentally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

A mixture of 2-amino-5-chlorobenzophenone (23.17 g., 0.10 m.) and 3-quinuclidinone hydrochloride (16.16 g., 0.10 m.) in polyphosphoric acid (300 g.) is heated slowly to 20° C., and held there for one-half hour. The dark red mixture is allowed to cool to ca. 110° C., then poured into ice water, and basified with 45% potassium hydroxide. The product separates as a yellow crystalline solid (32.0 g., 100%) M.P. 219–220° C. (uncorr.). The crude product is recrystallized from 2-propanol yielding yellow prisms of 8-chloro-2,3-dihydro-10-phenyl-1,4-ethanobenzo[b][1,5]naphthyridine, (21.0 g., 65.6%), M.P. 233.5–234° C. (uncorr.).

Analysis.—Calc'd for $C_{20}H_{17}ClN_2$ (percent): C, 74.86; H, 5.34; N, 8.74. Found (percent): C, 74.61; H, 5.61; N, 8.67.

In a similar manner, 7-bromo-2,3-dihydro-2-methyl-10-(p-tolyl)-1,4-ethanobenzo[b][1,5]naphthyridine and 2 - (p - bromobenzyl) - 2,3 - dihydro - 10 - phenyl - 1,4 - ethanobenzo[b][1,5]naphthyridine are obtained.

EXAMPLE II

A mixture of 2-aminobenzophenone (11.5 g.) and 3-quinuclidinone hydrochloride (16.0 g.) in acetic acid (300 g.) is heated slowly at reflux overnight. The reaction mixture is allowed to cool to 100° C., poured into ice water, and basified with 1 N potassium hydroxide. The product separates as a crystalline solid and is recrystallized from propanol yielding 2,3-dihydro-10-phenyl-1,4-ethanobenzo[b][1,5]naphthyridine.

Similarly, 2,3 - dihydro - 2 - phenyl - 1,4 - ethanobenzo[b][1,5]naphthyridine; and 2-(p-butoxyphenyl)-2,3-dihydro-1,4-ethanobenzo[b][1,5]naphthyridine are prepared.

EXAMPLE III

A mixture of 2-amino-2',5-dichloro-benzophenone (20.0 g.) and 3-quinuclidinone hydrochloride (15 g.) in trifluoroacetic acid (300 g.) is heated at reflux for one hour. After cooling to ambient temperatures, the reaction mixture is poured into ice water and then basified with 1 N sodium hydroxide. The resulting precipipate is recrystallized from ethanol to yield 8-chloro-10-(o-chlorophenyl) - 2,3 - dihydro - 1,4 - ethanobenzo[b][1,5]naphthyridine.

EXAMPLE IV

Employing the procedure of Examples I to III and starting with an appropriate 2-amino carbonyl compound and 3-quinuclidinone, the following 2,3-dihydro-1,4-ethanobenzo[b][1,5]naphthyridines are produced:

3 - (p - bromophenyl) - 2,3 - dihydro - 10 - (2 -pyridyl)-1,4-ethanbenzo[b][1,5]naphthyridine;

2,3 - dihydro - 10 - (2 - thienyl) - 1,4 - ethanobenzo[b][1,5]naphthyridine;

10 - ethyl - 2,3 - dihydro - 6 - methyl - 1,4 -ethanobenzo[b][1,5] naphthyridine;

2,3 - dihydro - 2,10 - di -(p - methoxybenzyl) - 1,4 - ethanbenzo[b][1,5]naphthyridine;

10 - (2 -furyl) - 2,3 - dihydro - 7 - nitro - 1,4 - ethanobenzo[b][1,5]naphthyridine;

2 - (m - chlorophenyl) - 2,3 - dihydro - 10 - (p - propoxyphenyl)-1,4-ethanobenzo[b][1,5]naphthyridine;

10 - (p - bromophenyl) - 3 -ethyl -2,3 - dihydro - 8-iodo-1,4-ethanobenzo[b][1,5]naphthyridine;

2,3 - dihydro - 2,7,10 - tripropyl - 1,4 - ethanobenzo[b][1,5]naphthyridine; and 2 - benzyl - 2,3 - dihydro - 10 - (p - methylbenzyl) - 1,4-ethanobenzo[b][1,5]naphthyridine.

EXAMPLE V

A mixture of 2-amino-4'-methoxy-5-methylbenzophenone (10.0 g.) and 5-(p-toly)-3-quinuclidinone hydrochloride (7.5 g.) in polyphosphoric acid (150 g.) is heated to 175° C. for one and a half hours. After cooling to about 110° C., the reaction mixture is poured into ice water and then basified with 50% sodium hydroxide. The resulting precipitate is recrystallized from butanol to yield 2,3-dihydro-8-methyl-10-(p-methoxyphenyl)-3-(p-tolyl)-1,4-ethanobenzo[b][1,5]naphthyridine.

In a similar manner, 10-(p-chlorobenzyl)-2,3-dihydro-1,4-ethanobenzo[b][1,5]naphthyridine and 10-(p-bromophenyl) - 2,3 - dihydro - 1,4 - ethanobenzo[b][1,5]naphthyridine are synthesized.

EXAMPLE VI

A mixture of 2-amino-5-ethoxy-4'-iodo-benzophenone (20.0 g.) and 6-(p-methoxyphenyl)-3-quinuclidinone hydrobromide (15 g.) in methylsulfonic acid (350 g.) is heated to 180° C. for one hour. After cooling to about 100° C., the reaction mixture is poured into ice water and then basified with 45% potassium hydroxide. The resulting precipitate is recrystallized from 2-propanol to yield 8-ethoxy - 2,3 - dihydro-10-(p-iodophenyl)-2-(p-methoxyphenyl)-1,4-ethanobenzo[b][1,5]naphthyridine.

In a similar manner, the following 1,4-ethanobenzo[b][1,5]naphthyridines are produced:

8-chloro-10-(p-fluorophenyl)-2,3-dihydro-1,4-ethanobenzo[b][1,5]naphthyridine;

2,3-dihydro-10-methyl-1,4-ethanobenzo[b][1,5] naphthyridine;

2,3-dihydro-2,10-dimethyl-1,4-ethanobenzo[b][1,5] naphthyridine;

2,3-dihydro-2-(p-iodobenzyl)-10-(p-methoxyphenyl)-1,4-ethanobenzo[b][1,5]naphthyridine;

10-(m-ethoxybenzyl)-2,3-dihydro-3-(p-propylphenyl)-1,4-ethanobenzo[b][1,5]naphthyridine; and 10-benzyl-2-(p-chlorobenzyl-2,3-dihydro-1,4-ethanobenzo[b][1,5]naphthyridine.

EXAMPLE VII

A mixture of 2-amino-4'-ethylbenzophenone (20.0 g.) and 3-quinuclidinone hydrochloride (15 g.) in benzenesulfonic acid (300 g.) is heated to 200° C. for one-half hour. After cooling to ambient temperatures, the reaction mixture is poured into ice water and then basified with 1 N potassium hydroxide. The resulting precipitate is recrystallized from butanol to yield 10-(p-ethylphenyl)-2,3-dihydro-1,4-ethanobenzo[b][1,5]naphthyridine.

In a similar manner, 2-aminobenzophenone is reacted with 5-(p-methoxyphenyl)-3-quinuclidinone hydrochloride to yield 2,3-dihydro-3-(p-methoxyphenyl)-10-phenyl-1,4-ethanobenzo[b][1,5]naphthyridine.

EXAMPLE VIII

The procedure of Example VII is repeated reacting the following 2-aminobenzophenone and 3-quinuclidinone acid salts to produce the hereinafter listed products.

| Starting materials | Products |
|---|---|
| 2-amino-6-chlorobenzophenone and 5-(p-ethoxyphenyl)-3-quinuclidinone hydrochloride. | 9-chloro-3-(p-ethoxyphenyl)-2,3-dihydro-10-phenyl-1,4-ethanobenzo[b][1,5]naphthyridine. |
| 2-aminobenzophenone and 6-(m-iodophenyl)-3-quinuclidinone hydroiodide. | 2,3-dihydro-2-(m-iodophenyl)-10-phenyl-1,4-ethanobenzo[b][1,5]naphthyridine. |
| 2-amino-4'-chloro-5-methylbenzophenone and 6-(p-methylbenzyl)-3-quinuclidinone hydrobromide. | 10-(p-chlorophenyl)-2,3-dihydro-8-methyl-2-(p-methylbenzyl)-1,4-ethanobenzo[b][1,5]naphthyridine. |
| 2-aminobenzophenone and 6-(p-ethylbenzyl)-3-quinuclidinone hydrochloride. | 2-(p-ethylbenzyl)-2,3-dihydro-10-phenyl-1,4-ethanobenzo[b][1,5]naphthyridine. |

EXAMPLE IX

A mixture of 2-aminobenzophenone (10.0 g.) and 5-(p-propoxybenzyl)-3-quinuclidinone hydrochloride (7.0 g.) in toluenesulfonic acid (250 g.) is heated to 190° C. for one hour. After cooling to about 90° C., the reaction mixture is poured into ice water and then basified with 0.5 N sodium hydroxide. The resulting precipitate is recrystallized from ethanol to yield 2,3 - dihydro-3-(p-propoxybenzyl) - 10 - phenyl-1,4-ethanobenzo[b][1,5] naphthyridine.

Employing the above procedure, the hereinafter listed compounds are prepared:

10-(m-butylbenzyl)-2,3-dihydro-1,4-ethanobenzo[b] [1,5]naphthyridine;

9-bromo-2,3-dihydro-10-(p-iodobenzyl)-1,4-ethanobenzo[b][1,5]naphthyridine; and 2,10-dibenzyl-6-chloro-2,3-dihydro-1,4-ethanobenzo-[b][1,5]naphthyridine.

What is claimed is:
1. A compound selected from the group consisting of those having the formula:

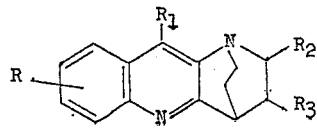

wherein R is selected from the group consisting of hydrogen, halogen, nitro, lower alkyl and lower alkoxy; $R_1$ is selected from the group consisting of hydrogen, lower alkyl, phenyl, halophenyl, lower alkylphenyl, lower alkoxyphenyl, benzyl, halobenzyl, lower alkylbenzyl, lower alkoxybenzyl, pyridyl, furyl and thienyl; and $R_2$ and $R_3$ are selected from the group consisting of hydrogen, lower alkyl, phenyl, lower alkylphenyl, halophenyl, lower alkoxyphenyl, benzyl, halobenzyl, lower alkylbenzyl, and lower alkoxybenzyl with the proviso that at least one of $R_2$ and $R_3$ is hydrogen.

2. A compound as described in claim 1 wherein R is chloro fixed in the 8-position; $R_1$ is phenyl and $R_2$ and $R_3$ are hydrogen which is: 8-chloro-2,3-dihydro-10-phenyl-1,4-ethanobenzo[b][1,5]naphthyridine.

3. A compound as described in claim 1 wherein R is chloro fixed in the 8-position; $R_1$ is o-chlorophenyl; and $R_2$ and $R_3$ are hydrogen which is: 8-chloro-10-(o-chlorophenyl) - 2,3 - dihydro - 1,4 - ethanobenzo[b][1,5]naphthyridine.

4. A compound as described in claim 1 wherein R, $R_2$ and $R_3$ are hydrogen; and $R_1$ is phenyl which is: 2,3-dihydro - 10 - phenyl - 1,4 - ethanobenzo[b][1,5]naphthyridine.

5. A compound as described in claim 1 wherein R, $R_2$ and $R_3$ are hydrogen; and $R_1$ is methyl which is: 2,3-dihydro-10-methyl-1,4-ethanobenzo[b][1,5]naphthyridine.

6. A compound as described in claim 1 wherein R and $R_3$ are hydrogen; and $R_1$ and $R_2$ are methyl which is: 2,3-dihydro - 2,10 - dimethyl - 1,4 - ethanobenzo[b][1,5]naphthyridine.

7. A compound as described in claim 1 wherein R and $R_3$ are hydrogen; $R_1$ is phenyl; and $R_2$ is p-bromophenyl which is: 2-(p-bromophenyl)-2,3-dihydro-10-phenyl-1,4-ethanobenzo[b][1,5]naphthyridine.

References Cited

Gallagher et al.: J. Chem. Soc. 1962, 5110–20.
Kempter et al.: Ber. 98(2), 419–27 (1965).
Popp et al.: Chem. Revs. 58, 321–400 (1958), pp. 321, 322 and 326 relied upon.

NORMA S. MILESTONE, Primary Examiner
G. T. TODD, Assistant Examiner

U.S. Cl. X.R.
260—294.7; 424—258